(12) United States Patent
Hidaka

(10) Patent No.: US 6,320,980 B1
(45) Date of Patent: *Nov. 20, 2001

(54) IMAGE PROCESSING APPARATUS AND METHOD, AND RECORDING MEDIUM

(75) Inventor: Yumiko Hidaka, Inagi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/724,314

(22) Filed: Oct. 1, 1996

(30) Foreign Application Priority Data

Oct. 2, 1995 (JP) ........................................... 7-255141
Oct. 2, 1995 (JP) ........................................... 7-255142

(51) Int. Cl.$^7$ ........................................... G06K 9/00
(52) U.S. Cl. ........................................... 382/167; 358/518
(58) Field of Search ........................................... 382/167, 162, 382/166; 358/500, 518, 520, 521, 522, 523, 524, 527, 529, 530

(56) References Cited

U.S. PATENT DOCUMENTS 5,444,544 * 8/1995 Oka et al. ............................. 358/518
5,532,848   7/1996 Beretta ................................. 358/504
5,814,932 * 9/1998 Matsuda .............................. 313/461

FOREIGN PATENT DOCUMENTS

03163334A * 7/1991 (JP) ............................. G01N/21/47
409093451A * 4/1997 (JP) ............................. H04N/1/60

* cited by examiner

Primary Examiner—Jerome Grant, II
(74) Attorney, Agent, or Firm—Fitzpatrick, Cella, Harper & Scinto

(57) ABSTRACT

The present invention provides an image processing method for obtaining a conversion parameter to be used for a signal conversion process between body color image data and light source color image data, said method comprising the steps of calculating a conversion parameter to match color sight between a body color and a light source color with each other, for each of a plurality of representative colors and calculating the conversion parameter to be used for the signal conversion process, on the basis of the plurality of conversion parameters for each of the plurality of representative colors, whereby a conversion coefficient applicable to an entire image can be obtained, and the signal conversion process between the body color and the light source color can be performed well without being affected by any characteristic of device.

15 Claims, 12 Drawing Sheets

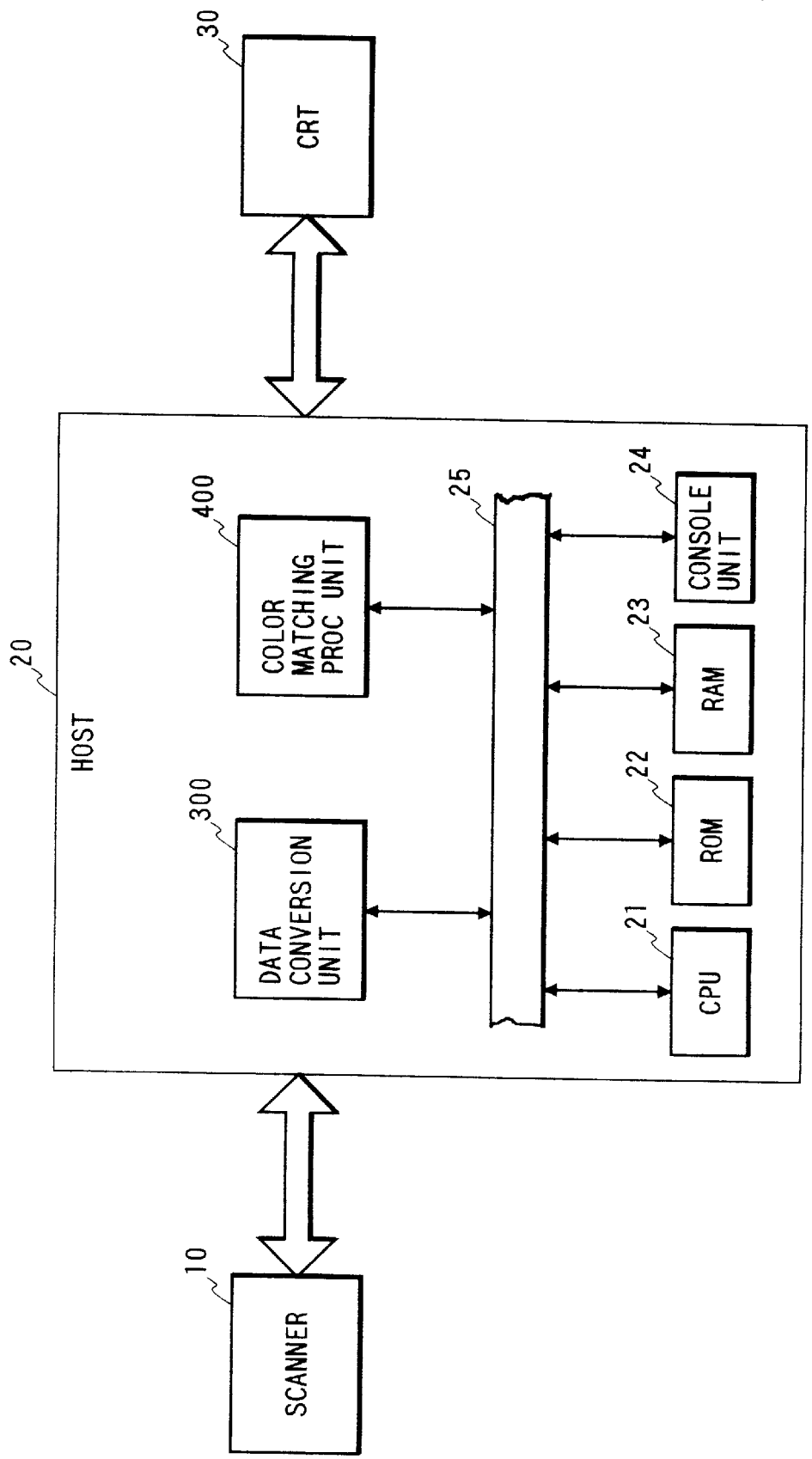

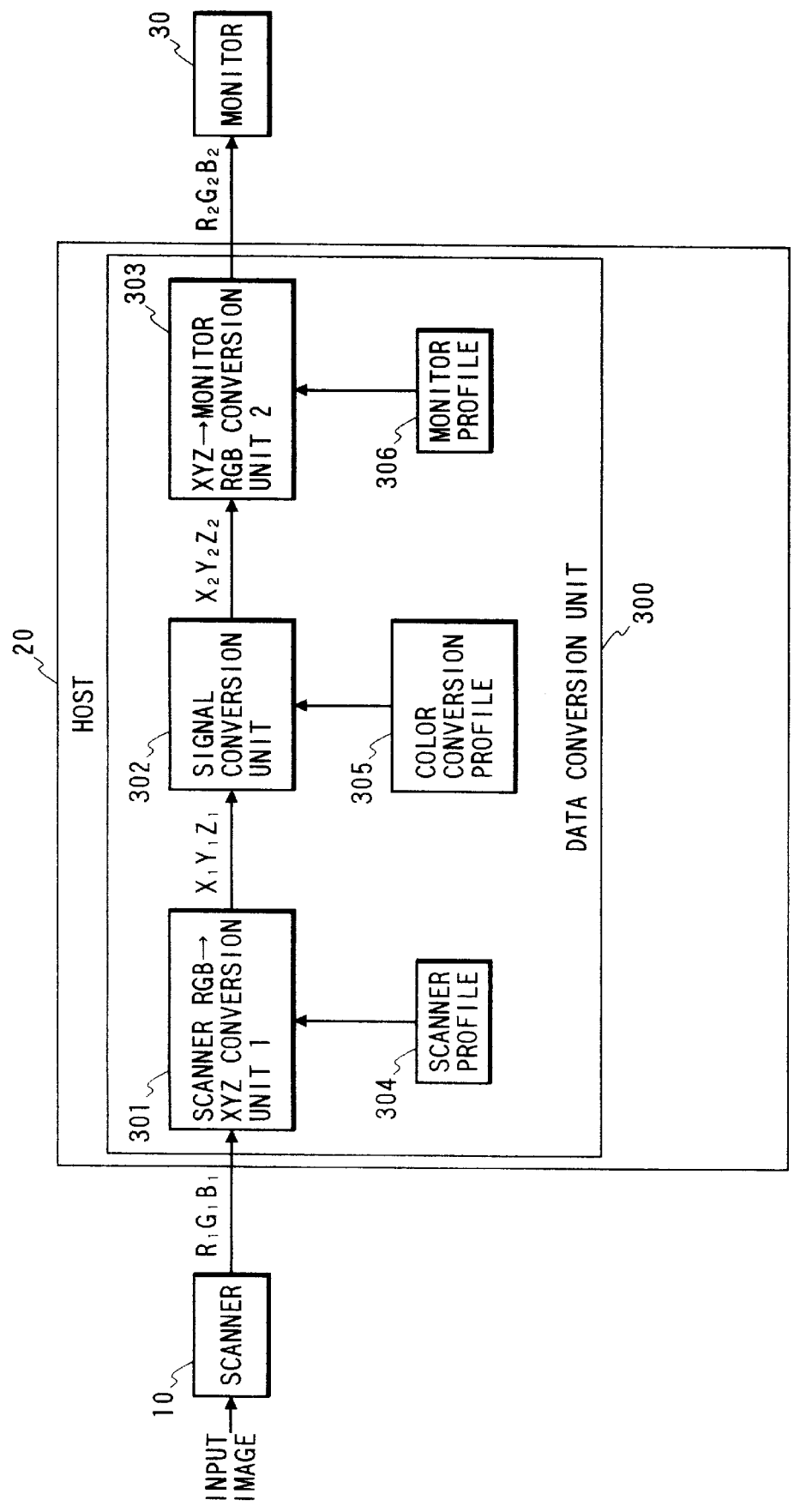

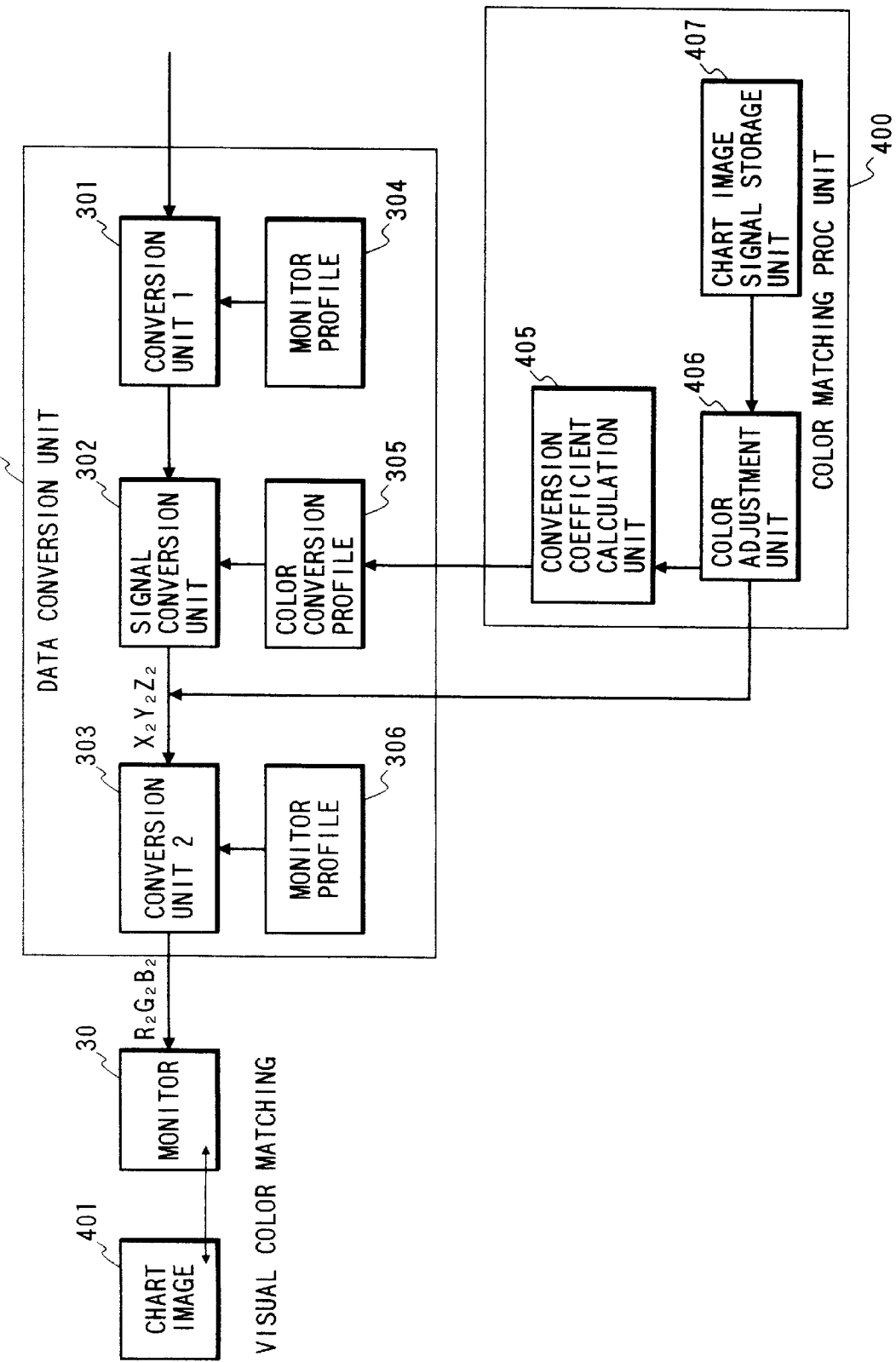

IMAGE PROCESSING APPARATUS AND METHOD, AND RECORDING MEDIUM

BACKGROUND OF THE INVENTION

1. Field of the Invention

The present invention relates to an image processing apparatus, an image processing method and a recording medium storing a program for such the method, which perform a color process for visually matching a body color and a light source color with each other.

2. Related Background Art

In recent years, color image products are widely popularized, so that a color image can easily be managed not only in a specific field of, e.g., producing a design by using computer graphics (CG) but also in general office environment. In such a state, in a case where the image formed on a monitor is output by an image printer, there is a problem that a color of the image on the monitor does not match or coincide with a color of the printed image. In order to solve such the problem, a color management system is being remarked. The color management system is to eliminate differences of colors in respective devices by using a common color space. At present, the differences of colors in the respective devices are intended to be corrected by using XYZ tristimulus values. Basically, if the two colors have the same value in the common color space, there colors should be viewed or observed as the same color. However, there is a problem that, even if they have the same value, these two colors cannot actually be viewed as the same color because of a difference in spectral waveform or the like due to a difference in modes between a light source color and a body color.

In this case, the light source color is a color of a light generated from a light source, and the body color is a color of a body (or substance, object) on which the light is reflected or to which the light penetrates.

As a method for solving the above problem, it can be supposed that a color matching experiment is performed in each color to determine a conversion coefficient in each color.

However, in case of actually outputting the image formed on a CRT or the like, a very large number of colors are used, as can be understood from a natural image. Therefore, a long period of time is necessary to determine the conversion coefficient for each color by performing the color matching experiment for each color, because of following reasons:

1) the color matching experiments are necessary for a large number of colors;
2) the color matching experiments are necessary to be performed by a large number of persons; and
3) a long period of time is necessary for performing the color matching experiment for a single color.

Another problem will be explained with reference to FIG. 12. FIG. 12 shows a conventional example. In the drawing, each axis is proposed by graphing a relationship of the conversion coefficients each obtained by performing the color matching experiment for each color. Each of reference numerals k1, k2 and k3 denotes the conversion coefficient for each color. As can be understood from the drawing, it can be seen a dispersion (or incoincidence) among the conversion coefficients calculated for the respective colors. Further, such the dispersion is also generated due to the color which is subjected to the color matching experiment, a size of a sample which is subjected to the color matching experiment, a difference in background color and the like.

In case of actually managing the image, changing of the conversion coefficient for each color by using such the method is corresponding to changing of the conversion coefficient for each pixel, so that it is very difficult to do so.

Further, in order to solve the above problem which is due to the difference in the modes between the light source color and the body color, it is conventionally used a method shown in FIG. 13.

That is, conventionally, there has been provided a sensor for sensing or detecting an ambient light or the like, and thus a color conversion has been performed by using ambient light information obtained from the sensor.

In such a conventional example, since a correction is performed by using the ambient light information obtained from the sensor which detects an environment light in case of observing the image, if there is no sensor for detecting the environment light in input and output devices such as a monitor, a printer and the like, the above method shown in FIG. 13 cannot be applied.

SUMMARY OF THE INVENTION

The present invention is being made in consideration of the above problems, and thus an object of the present invention is to be able to match color sight between a body color and a light source color with each other, with simple structure.

Concretely, the object of the present invention is to easily obtain conversion parameters which are used in a signal process, so as to match the color sight between the body color and the light source color with each other.

Another object of the present invention is to provide a signal conversion method between the body color and the light source color which method is applicable even in case of observing an image by using an input/output device which does not have any sensor for sensing or detecting an environment light.

In order to achieve the above objects, the present invention provides an image processing method for obtaining the conversion parameter to be used for a signal conversion process between body color image data and light source color image data, the method comprising the steps of:

calculating the conversion parameter to match the color sight between the body color and the light source color with each other, for each of a plurality of representative colors; and calculating the conversion parameter to be used for the signal conversion process, on the basis of the plurality of the conversion parameters for each of the plurality of representative colors.

In order to achieve the above objects, the present invention further provides an image processing method, wherein, in order to obtain a color signal which is sensed by performing a visual observation and a color matching of the light source color and the body color, a color matching experiment is performed for each of n colors to determine n correction coefficients ($k_r$, $k_g$, $k_b$) for the respective n colors which are used for converting tristimulus values ($X_{1i}$, $Y_{1i}$, $Z_{1i}$) of the light source color and tristimulus values ($X_{2i}$, $Y_{2i}$, $Z_{2i}$) of the body color in a following equation 1-(2), and the tristimulus values of the light source color and the body color are converted by using an average value of the n correction coefficients.

$$\begin{pmatrix} X_{1i} \\ Y_{1i} \\ Z_{1i} \end{pmatrix} = \begin{pmatrix} X_r & X_g & X_b \\ Y_r & Y_g & Y_b \\ Z_r & Z_g & Z_b \end{pmatrix} \begin{pmatrix} f(R) \\ f(G) \\ f(B) \end{pmatrix} \quad \text{equation 1-(1)}$$

$$\begin{pmatrix} X_{2i} \\ Y_{2i} \\ Z_{2i} \end{pmatrix} = \begin{pmatrix} k_a & 0 & 0 \\ 0 & k_b & 0 \\ 0 & 0 & k_c \end{pmatrix} \begin{pmatrix} X_{1i} \\ Y_{1i} \\ Z_{1i} \end{pmatrix} \quad \text{equation 1-(2)}$$

In order to achieve the above objects, the present invention further provides an image processing apparatus for obtaining the conversion parameter to be used for the signal conversion process between the body color image data and the light source color image data, the apparatus comprising:

color matching mean for performing a visual color matching of the body color corresponding to white and the light source color; and calculation means for calculating the conversion parameter on the basis of corresponding between the body color and the light source color obtained by the color matching means.

The above and other objects of the present invention will be apparatus from the following detailed description in conjunction with the attached drawings.

BRIEF DESCRIPTION OF THE DRAWINGS

FIG. 4 is a block diagram showing an example of structure of an image processing system according to the first embodiment of the present invention;

FIG. 5 is a block diagram showing an example of structure of a data conversion unit according to the first embodiment of the present invention;

FIG. 6 is a block diagram showing an example of structure of a color matching conversion unit according to the first embodiment of the present invention;

DETAILED DESCRIPTION OF THE PREFERRED EMBODIMENTS

First Embodiment

Figure 1:
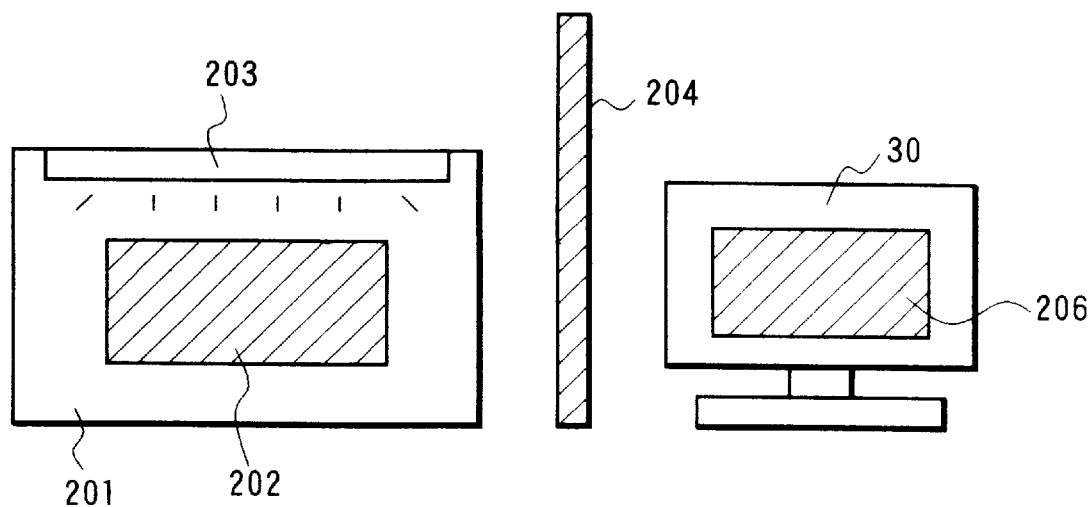
FIG. 1 is a view showing an example of an apparatus performing a color matching experiment according to the first embodiment of the present invention.

FIG. 1 is a view showing an example of an apparatus which performs a color matching experiment according to the present invention. The apparatus comprises a monitor 30 for displaying a light source color and an illumination booth 201 for observing a body color, so that the light source color and the body color can be observed simultaneously. A partition 204 is provided between the monitor 30 and the booth 201 such that one light does not affect how an image is viewed or observed under the other light. It will be explained hereinafter a method in which an image 206 displayed on the monitor 30 and an image 202 provided in the booth 201 are visually observed and subjected to a color matching by using the apparatus so as to obtain a conversion method between the light source color and the body color.

In the present embodiment, an illumination light source 203 is provided in the illumination booth 201, so that the color can be observed under a predetermined light source. As the illumination light source, e.g., a color observation light regulated by Japan Industrial Standards (JIS), a fluorescent light used in general office environment or the like can be used.

Initially, in order to be able to display on the monitor the color having the same tristimulus values as those of the body color observed in the booth, monitor characteristics such as a gamma characteristic, a chromaticity of fluorescent substance (body), a chromaticity of white point, a color temperature and the like are grasped, and an individual difference of the monitor is eliminated, such that a necessary color can be freely obtained.

As the gamma characteristic of the monitor, it may be used the same value $\gamma=2.2$ as in a monitor displaying an image by using an NTSC signal. However, in order to more increase color displaying accuracy, a relationship between a CRT control signal for each of RGB colors and a color measurement value such as emission luminance or the like may be used in a form of look-up table (LUT) or in a form of approximation by using a curve.

Hereinafter, a color signal conversion of the light source color and the body color will be explained by using equations 1-(1) and 1-(2) as conversion equations.

$$\begin{pmatrix} X_{1i} \\ Y_{1i} \\ Z_{1i} \end{pmatrix} = \begin{pmatrix} X_r & X_g & X_b \\ Y_r & Y_g & Y_b \\ Z_r & Z_g & Z_b \end{pmatrix} \begin{pmatrix} f(R_i) \\ f(G_i) \\ f(B_i) \end{pmatrix} \quad \text{equation 1-(1)}$$

$$\begin{pmatrix} X_{2i} \\ Y_{2i} \\ Z_{2i} \end{pmatrix} = \begin{pmatrix} k_a & 0 & 0 \\ 0 & k_b & 0 \\ 0 & 0 & k_c \end{pmatrix} \begin{pmatrix} X_{1i} \\ Y_{1i} \\ Z_{1i} \end{pmatrix} \quad \text{equation 1-(2)}$$

If the CRT control signal is set as $R_i$, $G_i$, $B_i$, its gamma-corrected value is represented by $f(R_i)$, $f(G_i)$, $f(B_i)$. Further, $(X_r, Y_r, Z_r)$ represent tristimulus values of CRT fluorescent substance red, $(X_g, Y_g, Z_g)$ represent tristimulus values of CRT fluorescent substance green, and $(X_b, Y_b, Z_b)$ represent tristimulus values of CRT fluorescent substance blue. As shown in the equation 1-(1), when the gamma-corrected value is multiplied by the tristimulus values of each fluorescent substance, tristimulus values $(X_{1i}, Y_{1i}, Z_{1i})$ of the light source color can be obtained. Further, when the obtained tristimulus values of the light source color is multiplied by a conversion characteristic of the equation 1-(2), tristimulus values $(X_{2i}, Y_{2i}, Z_{2i})$ of the body color can be obtained.

Figure 2:
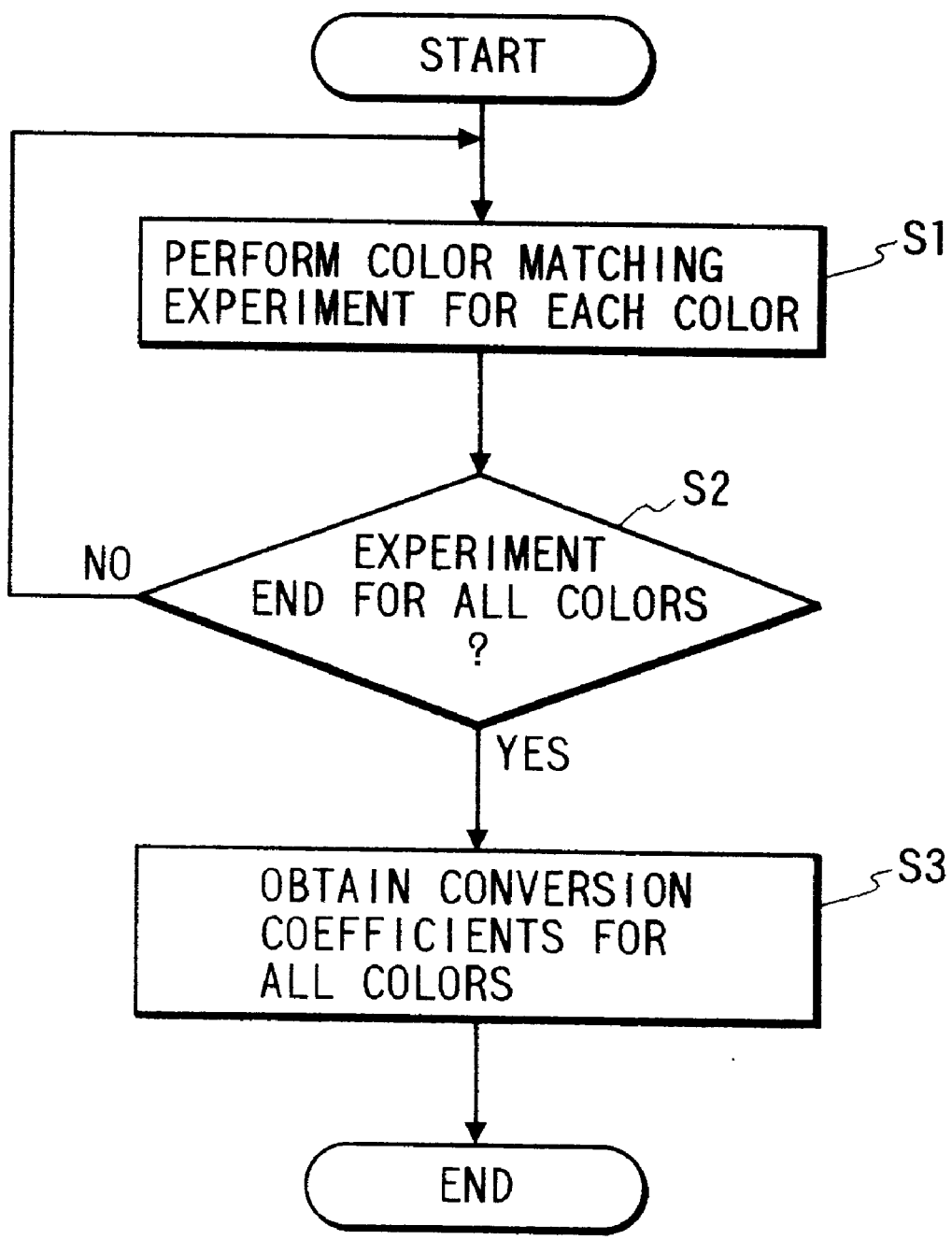
FIG. 2 is a flow chart showing a conversion coefficient calculation process according to the first embodiment of the present invention.

FIG. 2 is a flow chart showing a conversion coefficient calculation process in the present embodiment.

In order to obtain conversion coefficients ($k_r$, $k_g$, $k_b$) for the tristimulus values of the light source color and the body color, the body color of which tristimulus values have been already known and which can be observed in the illumination booth is displayed on the CRT, and the visual color matching is performed for these two colors. Then, when the light source color and the body color on the CRT are visually sensed to be matched or coincided with each other, the tristimulus values ($X_{1i}$, $Y_{1i}$, $Z_{1i}$) of the light source color on the CRT are obtained, whereby conversion coefficients ($k_r$, $k_g$, $k_b$) in the equation 1-(1) for the body color is obtained based on the tristimulus values of the body color and the light source color (step S1).

Then, the above process is repeated for all colors of which tristimulus values represent the stored body color (step S2).

Then, one conversion coefficient is calculated from the conversion coefficients for the respective colors calculated in the above-described method (step S3).

Figure 3:
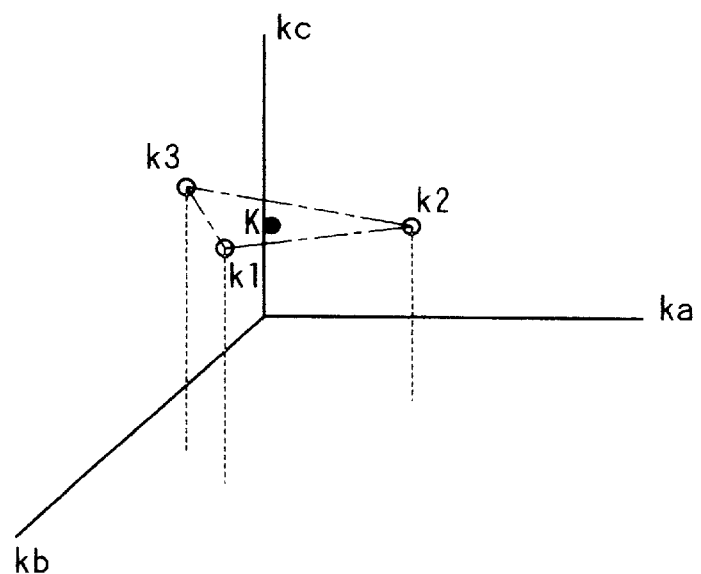
FIG. 3 is a view showing concept of a conversion coefficient calculation method according to the first embodiment of the present invention.

FIG. 3 shows an example of such the calculation method. In the drawing, each of reference numerals $k_1$, $k_2$ and $k_3$ denotes the conversion coefficient obtained for each color. In the present embodiment, a conversion coefficient k is determined from an average of the conversion coefficients calculated for all colors. The conversion coefficient is calculated by performing the color matching experiment for one single color. However, when the color matching experiments are performed for different colors, it is possible that the conversion coefficients are dispersed as shown in FIG. 3 because of various reasons, e.g., error in the color matching experiment, difference of sight due to nature of color, and the like. In a case where a single correction coefficient is calculated from these dispersed conversion coefficients, when an average value of these conversion coefficients are used as in an equation (2), a center k of a triangle shown in FIG. 3 represents the conversion coefficient calculated from three colors.

$$k=(k_1+k_2+k_3+\ldots k_n)/i\ n$$

$$k_n=(k_{an}, k_{bn}, k_{cn}) \quad \text{equation (2)}$$

(System)

Hereinafter, structure of an image processing system which performs the signal conversion process by using the conversion coefficient calculated in the above-described method will be explained with reference to the drawings.

FIG. 4 is a block diagram showing the structure of the image processing system according to the present embodiment.

In the system, a scanner 10 and a CRT (monitor) 30 are connected to a host 20 respectively via suitable external interfaces (not shown).

The host 20 comprises a color matching process unit 400 which calculates the conversion coefficient by using the above method, and a data conversion unit 300 which converts by using the calculated conversion coefficient the body color into the light source color such the sight of these two colors are matched or coincided with each other.

The data conversion unit 300 and the color matching process unit 400 are controlled by a CPU 21 connected via a CPU bus 25.

The CPU 21 controls each unit of the host in accordance with a program stored in a ROM 22, by using a RAM 23 as a work memory.

A console unit 24 is used, e.g., when an optimum displaying color is set in the color matching experiment.

Then, the data conversion unit 300 will be explained in detail with reference to FIG. 5.

The data conversion unit 300 converts $R_1G_1B_1$ body color image data representing an input image from the scanner 10, into $R_2G_2B_2$ light source color image data such that the sight of these two colors are matched with each other. Then, the unit 300 outputs the $R_2G_2B_2$ light source color image data to the monitor 30.

In the data conversion unit 300, in order to correct a distortion included in the $R_1G_1B_1$ body color image data due to a reading characteristic of the scanner 10, the $R_1G_1B_1$ body color image data depending on the scanner is initially converted into $X_1Y_1Z_1$ body color image data which is in an XYZ color space and does not depend on any device, on the basis of a scanner profile 304 in a conversion unit 1 (301). The scanner profile 304 stores data concerning the reading characteristic of the scanner 10, e.g., a color conversion matrix (scanner-dependent RGB→XYZ), an LUT and the like.

The $X_1Y_1Z_1$ body color image data is converted into $X_2Y_2Z_2$ light source color image data on the basis of conversion coefficients ($k_r$, $k_g$, $k_b$) which was calculated by the color matching process unit 400 and stored in a color conversion profile 305, in a signal conversion unit 302.

In a conversion unit 2 (303), the $X_2Y_2Z_2$ light source color image data is converted into the $R_2G_2B_2$ light source color image data dependent on the monitor, on the basis of a monitor profile 306. That is, the conversion process based on the monitor characteristic of the monitor 30 is performed by the conversion unit 2, so that the $X_2Y_2Z_2$ light source color image data can be faithfully reproduced on the monitor 30. The monitor profile 306 stores the monitor characteristics, e.g., a gamma characteristic, a color conversion matrix (XYZ→monitor-dependent RGB) based on a hue of fluorescent body, a hue of white point, a color temperature and the like, an LUT and the like.

FIG. 6 is a block diagram showing an example of the structure of the color matching process unit 400. Hereinafter, it will be explained the conversion coefficient calculation process in the color matching process unit 400, with reference to FIG. 6.

A chart image signal storage unit 407 stores a printed-matter chart image 401 and a chart image signal having the same tristimulus value as those of the image 401, and the chart image 401 is displayed on the monitor 30. Then, the image displayed on the monitor 30 and the printed-matter chart image 401 are visually observed, and a color adjustment parameter in a color adjustment unit 406 is manually set on the console unit 25 such that these two images are matched or coincided with each other. Thus, a color of the chart image displayed on the monitor 30 is adjusted such that a printed-matter chart and a light source color chart on the monitor 30 can be visually observed to be matched with each other. By using a relationship between these two charts at the time when adjusted and matched, the conversion coefficient is calculated by a conversion coefficient calculation unit 405, and obtained data is stored in the color conversion profile 305 in the data conversion unit 300. After then, such the stored conversion coefficient is used in case of converting any input signal.

In the present embodiment, since the chart image signal is represented in the XYZ color space, the signal is converted into the $R_2G_2B_2$ image data dependent on the CRT by the conversion unit 2 (303) of the data conversion unit 300.

In a case where the chart image is initially displayed on the CRT, since the chart image which is not yet color-adjusted is displayed, the color adjustment unit 406 does not perform the color adjustment for the chart image signal.

Hereinafter, it will be explained a case where the conversion coefficients are concretely calculated by using respective RGB gradation charts. Three charts of RGB of which tristimulus values are already known are displayed on the monitor 30 one by one such that the tristimulus values of the printed-matter chart and the light source color chart are matched with each other, and then the displayed chart and the printed-matter chart are visually compared. In this case, if the colors on these two charts cannot be observed to be matched with each other, the color of the chart displayed on the monitor 30 is adjusted by using the color adjustment unit 406, to match these two colors with each other. The color matching is performed for each of these three (RGB) charts respectively, whereby an optimal image can be determined. In this case, other method may be applied. That is, several kinds of image signals are produced from the chart image signal and displayed on the monitor 30 such that the most-matched signal is selected.

In accordance with the relationship between the optimal image signal and the original (or previous) image signal, the conversion characteristic in the equation 1 is calculated by the conversion coefficient calculation unit 405 for each chart. In the R gradation chart, since the tristimulus values of the light source color chart are $(X_{1i}, Y_{1i}, Z_{1i})$ and the tristimulus values of the body color chart are $(X_{2i}, Y_{2i}, Z_{2i})$ at the time of performing the color matching, the conversion coefficients $(k_r, k_g, k_b)$ can be calculated by using an equation 3 which represents an inversion conversion of the equation 1-(2).

$$\begin{pmatrix} X_{1i} \\ Y_{1i} \\ Z_{1i} \end{pmatrix} = \begin{pmatrix} k_a & 0 & 0 \\ 0 & k_b & 0 \\ 0 & 0 & k_c \end{pmatrix}^{-1} \begin{pmatrix} X_{2i} \\ Y_{2i} \\ Z_{2i} \end{pmatrix} \quad \text{equation 3}$$

By using a similar method, the conversion coefficients in the G and B gradation charts are calculated. Then, an average is obtained from these three conversion coefficients, and is stored in a conversion coefficient storage unit of a data conversion unit. In case of actually displaying the image, the input signal is converted in the data conversion unit by using the stored conversion coefficients and then the converted data is displayed on the monitor 30.

As explained above, according to the present embodiment, the conversion coefficients applicable to the entire image can be easily obtained.

Further, in the conversion unit 1, if the input image data is converted by using the scanner profile into the image data which does not depend on any device and is in the XYZ color space, the signal conversion between the body color and the light source color can be performed well without being affected by the device characteristic.

Modification of the First Embodiment

It will be explained hereinafter a case where a chart is used as an image to be used in the color matching experiment.

In this modification, a printed color comparison chart image is displayed on the monitor, and the displayed chart image is visually compared with the printed-matter chart. Then, by changing the chart image on the monitor, the chart which is just being visually color-matched with a body color chart. The conversion coefficient k in the equation 1-(2) is determined from the tristimulus values of the displayed chart image and the printed-matter chart image. In a case where a several number of charts are used to calculate the conversion coefficient, the conversion coefficient obtained from each chart by using a first method may be set as an average conversion coefficient. On the chart, one or more colors of image design patches are displayed. As such the patches, e.g., gradation, gray scale and the like may be utilized. Further, if a memorial color is remarked, natural images showing, e.g., human, woods, sea and the like may be used.

In the above first embodiment, the average value is used as the conversion coefficient. However, the present invention is not limited to such the first embodiment, but may be applied to a case where the conversion coefficients for all colors are obtained based on the conversion coefficients suitable for a plurality of colors.

Hereinafter, it will be explained a case where a weighting of color is considered. Human's eyes do not always see any colors in the same manner. That is, there is a color of which difference is strict for the human's eyes, or a color of which difference is not so strict for the human's eyes. If the conversion coefficient is obtained by averaging the plurality of coefficients irrespective of kinds of colors as in the first method, it is feared that a color correction is performed without considering such differences of color sight by the human's eyes. Therefore, as a third method, there is provided a method for calculating the conversion coefficient by weighting the colors. Although there are various methods as color weighting methods, the memorial color is mainly remarked. The memorial color is a familiar color for the human's eyes, e.g., sky blue, skin color, woody green or the like, and is a color which is memorized by any person. Since the human's eyes are extremely strict to the difference of such the memorial color, the conversion coefficient of such the memorial color is obtained with weighting it. For example, images of sea, sky, human, woods, prairie and the like can be utilized as the color comparison chart of natural image, because these images include a number of memorial colors. Then, by using a second method, the conversion coefficient between the light source color and the body color is calculated. Also, by using a general color gradation chart and a general gray-scale chart, the conversion coefficient is similarly calculated. In case of calculating the conversion coefficient, the memorial color is weighted by m times as large as a general color and then all of these colors are added and averaged, as shown in an equation (4).

equation 4: in case of single memorial color $k_1$ $$k = (mk_1 + k_2 + k_3 + \ldots k_n)/(i+1)$$

$$i_n = (k_{an}, k_{bn}, k_{cn})$$

The above method is applicable in a case where a correction coefficient is obtained by performing the color matching for each color. In such the case, when the colors to be subjected to the color matching are selected, even if the memorial color is included in such a selection, the color matching can be performed even for the memorial color by weighting it. In any case, the above method was explained by using the memorial color as an example, but is applicable in a case where a specific color other than the memorial color is weighted. Further, it was explained the method of averaging the conversion coefficients after the m-time weighting was performed, but other method is applicable to such the averaging.

In the above embodiments, the signal conversion process between the scanner and the monitor was explained. However, the present invention is not limited to these embodiments, but is applicable to any signal conversion between the body color and the light source color.

That is, the present invention is applicable to a signal conversion process which converts the light source color into the body color, between the monitor and the scanner.

Similarly, the present invention is also applicable to a signal conversion between the monitor and the printer.

According to the above-described embodiments, it can easily be obtained the conversion parameter which is used for the signal process to match the color sight between the body color and the light source color with each other.

Further, it can easily be obtained the conversion parameter by which the well signal process can easily be performed for the entire input image.

In the above embodiments, although the XYZ color space was used as the color space which does not depend on any device, other color space such as an L*a*b* color space or the like may be used.

The present invention may be applied to a system constructed by a plurality of equipments (e.g., host computer, interface equipment, reader, printer or the like) or may be also applied to an apparatus comprising one equipment (e.g., a copying machine, facsimile or the like).

Second Embodiment

Figure 7:
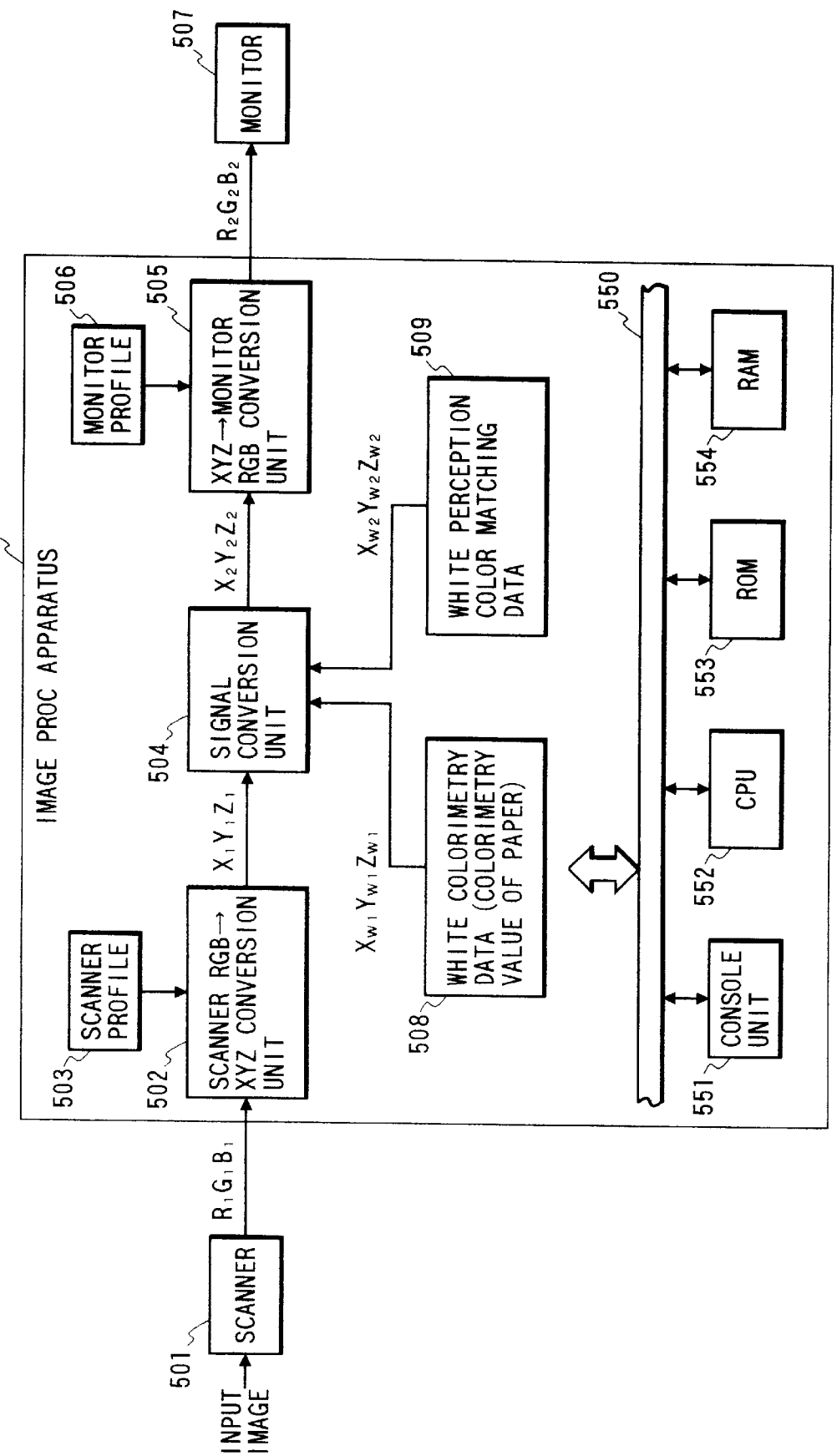
FIG. 7 is a block diagram showing an example of structure of an image processing apparatus according to a second embodiment of the present invention.
Figure 8:
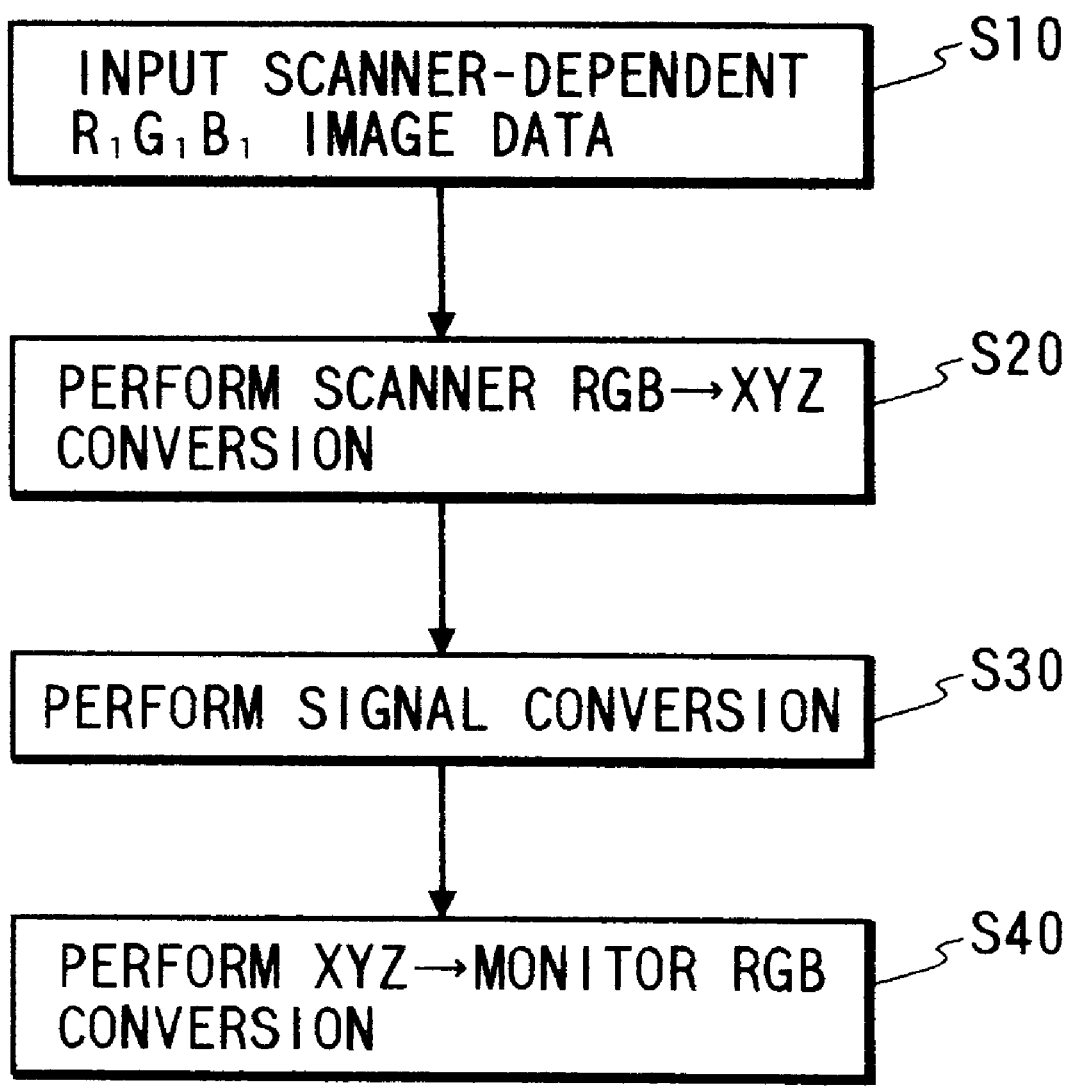
FIG. 8 is a flow chart showing a process performed by the image processing apparatus according to the second embodiment of the present invention.

FIG. 7 is a block diagram showing an image processing apparatus 500 concerning the second embodiment in which the present invention is applied to an image process between a scanner and a monitor. FIG. 8 is a flow chart showing such the image process.

It should be noted that, in addition to the image process between the scanner and the monitor, the present invention is applicable to various combinations of input and output equipments, e.g., between the monitor and a printer, and the like.

An object of the second embodiment is to display an image such that a color of the displayed image can be seen or observed to be the same as a color of a printed-matter image.

In the image processing apparatus 500, each unit is controlled by an CPU 552 via a CPU bus 550. That is, the CPU 552 controls each unit in accordance with a program stored in a ROM 553, by using a RAM 554 as a work memory.

Initially, an input image (of body color) is read by a scanner 501 (step S10). It will then be explained a case where a color signal obtained from the scanner 501 is RGB signals. On the basis of information stored in a scanner profile 503, obtained $R_1G_1B_1$ data dependent on the scanner are converted into $X_1Y_1Z_1$ signals not dependent on any device, by a scanner RGB→XYZ conversion unit 502 (step S20). Although the conversion is performed by using an XYZ color space, the present invention is not limited to this. That is, it may also be used any color space which can absorb a difference of device, e.g., a uniform color space.

The scanner profile 503 stores data concerning a color characteristic of the scanner, e.g., color conversion matrix (RGB→XYZ), LUT or the like.

Then, the obtained $X_1Y_1Z_1$ signals are converted, by a signal conversion unit 504, into $X_2Y_2Z_2$ signals in which an observation light source, a difference of modes between a light source color and the body color, and the like are considered (step S30). In the present embodiment, a conversion coefficient in a conversion equation is determined from data (white color measurement (colorimetry) data 508) obtained by measuring a color of a paper on which the input image is printed, and from white perception color matching data 509 obtained by a visual color matching based on the white color measurement data. Then, the entire input image is converted at a time.

In the present embodiment, a Von Kreis color adaptation equation shown as an equation 5 is used as the conversion equation. The calculated $X_2Y_2Z_2$ signals are converted by an XYZ→monitor RGB conversion unit 505 into $R_2G_2B_2$ signals which act as monitor input signals (step S40). At that time, it is used a monitor profile 506 which stores a monitor color characteristic, a gamma characteristic and the like. The obtained $R_2G_2B_2$ signals are output to a monitor 507.

equation 5: Von Kreis color adaptation equation $$\begin{pmatrix} X_2 \\ Y_2 \\ Z_2 \end{pmatrix} = \begin{pmatrix} M \end{pmatrix}^{-1} \begin{pmatrix} D \end{pmatrix} \begin{pmatrix} M \end{pmatrix} \begin{pmatrix} X_1 \\ Y_1 \\ Z_1 \end{pmatrix}$$

where $$\begin{pmatrix} D \end{pmatrix} = \begin{pmatrix} L_{w2}/L_{w1} & 0 & 0 \\ 0 & M_{w2}/M_{w1} & 0 \\ 0 & 0 & S_{w2}/S_{w1} \end{pmatrix}$$

$$\begin{pmatrix} M \end{pmatrix} = \begin{pmatrix} 0.071 & 0.945 & -0.016 \\ -0.461 & 1.360 & 0.101 \\ 0 & 0 & 1.0 \end{pmatrix}$$

$$\begin{pmatrix} L_{w1} \\ M_{w1} \\ S_{w1} \end{pmatrix} = \begin{pmatrix} M \end{pmatrix} \begin{pmatrix} X_{w1} \\ Y_{w1} \\ Z_{w1} \end{pmatrix}, \begin{pmatrix} L_{w2} \\ M_{w2} \\ S_{w2} \end{pmatrix} = \begin{pmatrix} M \end{pmatrix} \begin{pmatrix} X_{w2} \\ Y_{w2} \\ Z_{w2} \end{pmatrix}$$

$L_{w1}$, $M_{w1}$, $S_{w1}$:: response quantity for $X_{w1}$, $Y_{w1}$, $Z_{w1}$ at eye's cone level $X_{w1}$, $Y_{w1}$, $Z_{w1}$:: tristimulus values of test light (white color measurement (colorimetry) data)

$L_{w2}$, $M_{w2}$, $S_{w2}$:: response quantity for $X_{w2}$, $Y_{w2}$, $Zw_2$ at eye's cone level $X_{w2}$, $Y_{w2}$, $Z_{w2}$:: tristimulus values of reference light (white perception color matching data)

Hereinafter, it will be explained in detail a method for generating the white perception color matching data which is determined based on the white color measurement data 508 and used in the signal conversion unit 504, with reference to a flow chart shown in FIG. 9.

The white color measurement (colorimetry) data represents XYZ values which are obtained by measuring a color of a paper placed under one environment, i.e., the values $X_{w1}Y_{w1}Z_{w1}$ in the present embodiment. In FIG. 9, the values $X_{w1}Y_{w1}Z_{w1}$ are set as initial values and converted into the RGB monitor input signals of which colors are matched with those of the values $X_{w1}Y_{w1}Z_{w1}$ (step S50). Then, corresponding white is displayed on the monitor (step S60). In this case, if the displayed color is measured by way of experiment, it can be obtained the same value as that can be obtained when measuring the color on the paper. The white displayed on the monitor in such a manner is considered to be the white of the paper, and it is confirmed whether or not these two whites are color matched with each other (step S70). Generally, since the color on the monitor is the light source color and the color of the paper is the body color, these two whites cannot often be seen or observed as the same due to difference of modes, observation light source and the like. In such a case, they are adjusted by using a console unit 551 such that the white of the paper and the white on the monitor are visually matched with each other, and the value at the time of color matching is used as the white perception color matching data.

Figure 9:
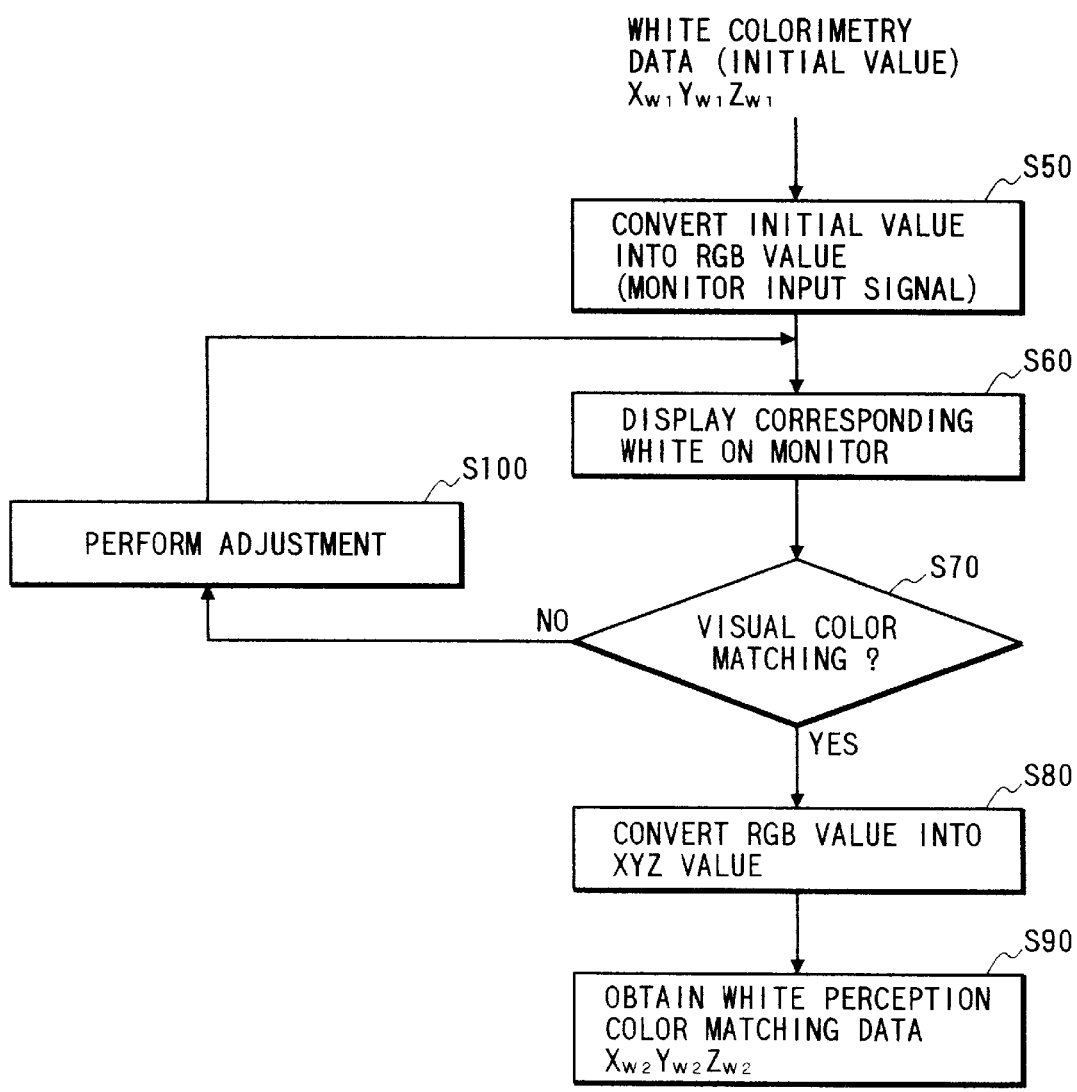
FIG. 9 is a flow chart showing an example of a white perception color matching data generation method according to the second embodiment of the present invention.
Figure 10:
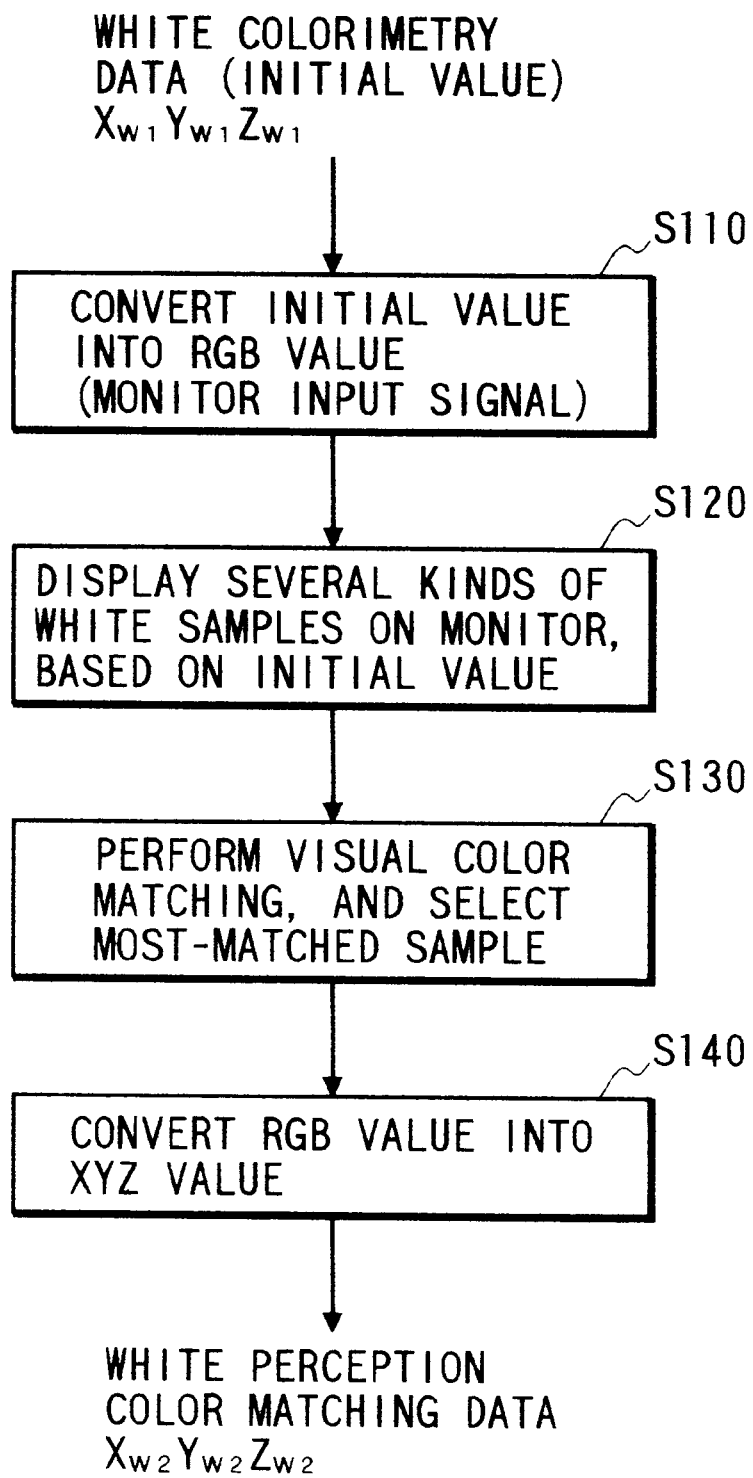
FIG. 10 is a flow chart showing an example of the white perception color matching data generation method according to the second embodiment of the present invention.

In the white perception data generation method shown in FIG. 9, it was explained that the adjustment is performed by the adjustment unit in case of determining the visually color-matched white data. However, as shown in a flow chart of FIG. 10, it may be supposed that several white samples for the visual color matching have been previously formed in correspondence with the white color measurement data and are displayed on the monitor, and then an optimal sample is selected when performing the visual color matching.

The white color measurement data which is set as the initial value is the data obtained by color measuring the paper in correspondence with one observation environment. However, it may be supposed a method in which the white color measurement data is stored in the file together with conditions, e.g., a kind of paper (normal paper, coating paper or the like), a light source (fluorescent light, incandescent light, sunlight or the like), and the condition is selected from among the stored conditions. Further, it may be applied the structure that a reflectance of the paper and a spectrum of the light source are stored in such the file, and the white color measurement data can be obtained by the calculation based on these data.

It was described that the signal conversion unit 504 performs the conversion by using the white color measurement data and the white perception color matching data determined based on the white color measurement data, and by using the Von Kreis color adaptation equation in the equation (5). However, in an actual operation, the value (white color measurement data) obtained by measuring the paper under the image observing environment is substituted for the tristimulus values $X_{w1}Y_{w1}Z_{w1}$ of the test light of the Von Kreis color adaptation equation, and the white value (white perception color matching data) determined by the above-described visual color matching is substituted for the tristimulus values $X_{w2}Y_{w2}Z_{w2}$ of the reference light. Then, the image is converted at a time, by using such the equation as obtained in this manner.

In the present embodiment, it was described the case where the image of which color can be seen to be the same as the printed-matter color is displayed on the monitor, i.e., the case where the light source color is controlled. Similarly, in case of outputting the image displayed on the monitor, the method in the present embodiment is applicable by previously forming the printer profile to control the printer output.

Further, the color signal such as white data or the like is applicable not only to the XYZ signal but also to various color signals such as L*a*b* signals.

Further, if a color reproduction range of the output equipment is narrower than that of the input image, a color space compression process may be performed in case of converting the input image into the data for the output equipment (at the conversion unit 505).

The present embodiment is based on the concept that the human's eyes see all colors by using white as a reference and comparing an objective color with the reference white. Therefore, even if the conversion is performed between different-mode colors, e.g., between the light source color and the body color, the image corresponding to various observing conditions can be produced within a short period of time by using the color signal obtained from the color matching experiment of only one color (especially the white utilized as the reference of sight) and the conversion equation formed from the color measurement value or the calculation value of such the color.

Further, in the present embodiment, since the conversion equation is formed by using the values obtained in the actual color matching experiment, a personal difference when seeing the color can be absorbed. Furthermore, since the reference color is determined with performing the color matching experiment under the actual observing light source, the present embodiment is applicable to a case where the input/output equipments not having any sensor to detect an external light such as the observing light source. In this case, since the value obtained by the actual human's color matching is used, the more excellent color matching can be obtained as compared with the case where the conversion is performed by the calculation based on the data from the sensor.

Further, the data suitable for various observing environment can be simply set color by color, without requiring a long period of time.

Modification of Second Embodiment

In the second embodiment, the signal conversion is performed by the color adaptation equation using the coefficient set based on the white color measurement data and the white perception color data.

On the other hand, in the modification of the second embodiment, a color conversion profile 608 is provided and the signal conversion is performed by using such the color conversion profile 608.

Figure 11:
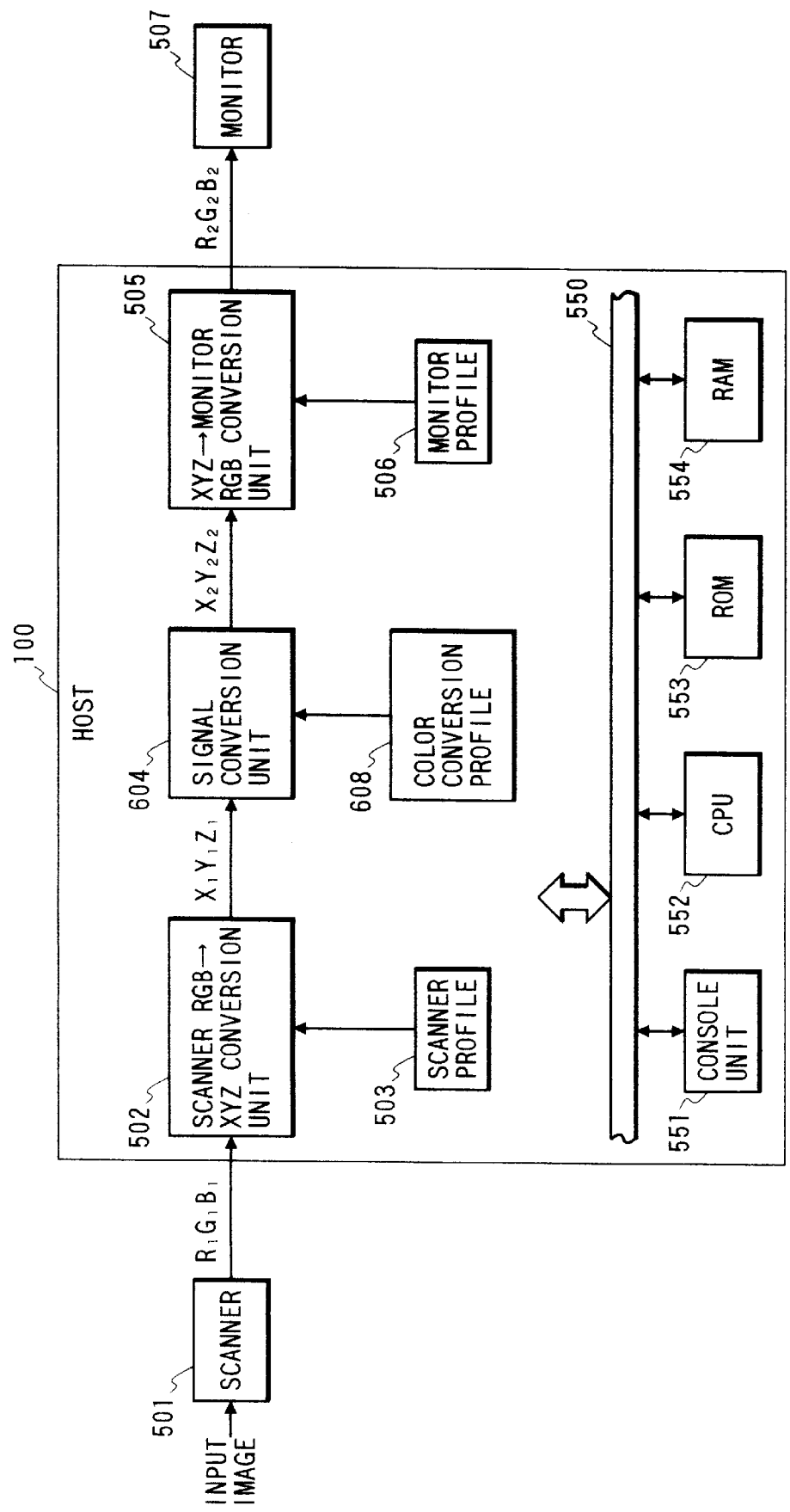
FIG. 11 is a block diagram showing an example of structure of an image processing apparatus according to a modification of the second embodiment of the present invention.
Figure 12:
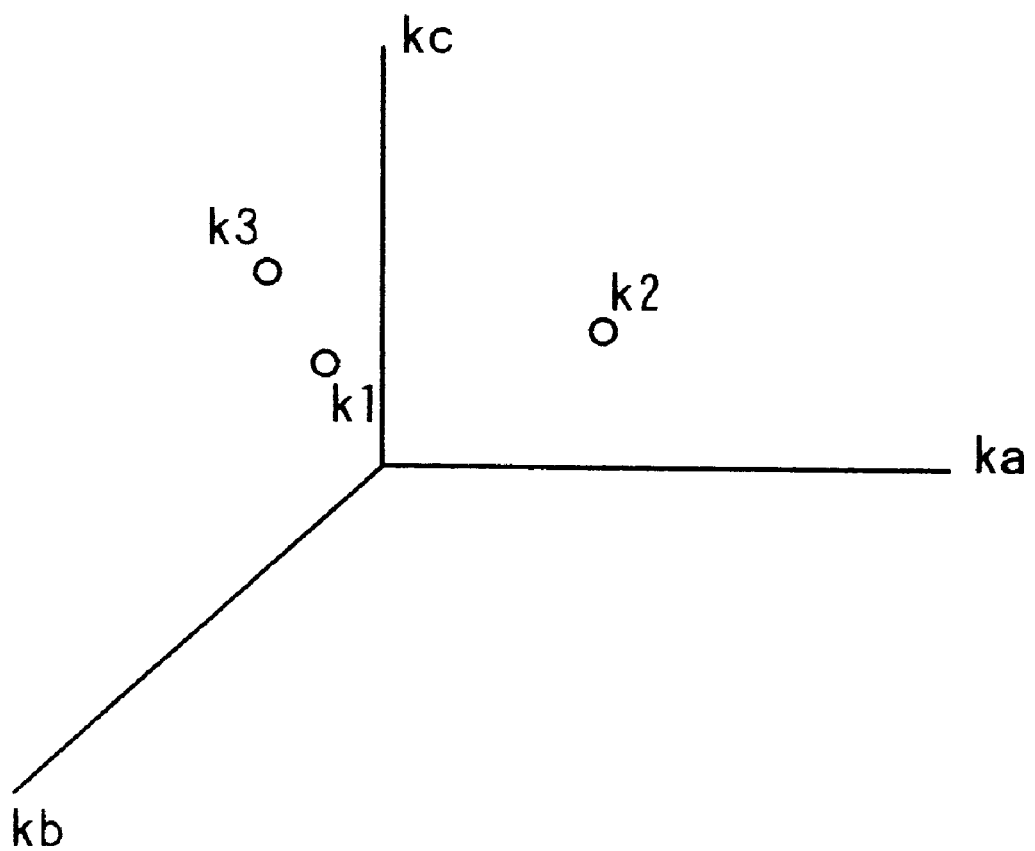
FIG. 12 is a view showing concept of a conventional conversion coefficient calculation method.
Figure 13:
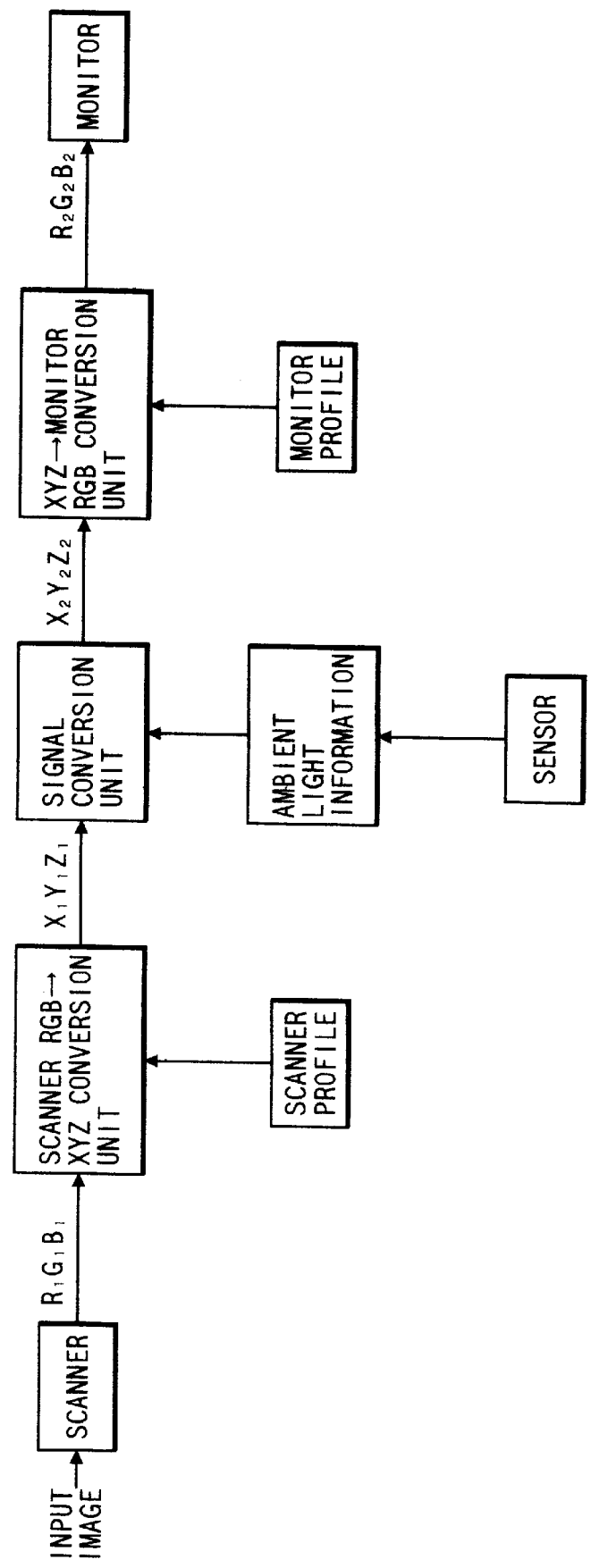
FIG. 13 is a block diagram showing structure of a conventional image processing apparatus.

It will be then explained the image processing apparatus according to the modification of the second embodiment, with reference to FIG. 11.

In FIG. 11, the same parts as those in the second embodiment have the same reference numerals, and explanations thereof are omitted.

The color conversion profile 608 stores an LUT or a matrix coefficient. In this case, the light source color and the body color are subjected to the visual color matching for the plurality of representative colors, and then the LUT or the matrix coefficient is produced from a relationship between the visually color-matched light source color and the body color.

The color conversion profile 608 is a profile to be used for correcting the data concerning the light source color and the body color of which color measurement (colorimetry) values are matched but of which sights are not matched.

A signal conversion unit 604 performs the signal conversion in the XYZ color space not dependent on any device, by using the color conversion profile 608, so as to absorb the difference of modes between the light source color and the body color or the difference of color reproducibility due to the observing condition.

If the color conversion profile is provided for each observing environment and each output equipment, e.g., monitor and the like, such that the profile is selected according to the observing environment input by the console unit 551 and the kind of the output equipment, the highly-accurate signal conversion can be performed.

According to the second embodiment and its modification, even in a case where the image is observed by using the input/output equipments having no sensor for sensing the environment light, the conversion parameters suitable for various environment can be simply calculated.

Other Embodiments

The present invention is applicable to a system constructed by a plurality of equipments (e.g., host computer, interface equipment, reader, printer or the like) or is also applicable to an apparats comprising one equipment (e.g., copying machine or a facsimile machine).

An invention embodied by a method whereby program codes of a software to realize the functions of the embodiment are supplied to a computer in an apparatus or system connected to various devices so as to make the devices operative in order to realize the functions of the foregoing embodiments and the various devices are operated in accordance with the programs stored in the computer (CPU or MPU) of the system or apparatus is also included in the scope of the present invention.

In such a case, the program codes themselves of the software realize the functions of the foregoing embodiments and the program codes themselves and means for supplying the program codes to the computer, for example, a memory medium in which the program codes have been stored construct the present invention.

As such a memory medium to store the program codes, for example, it is possible to use a floppy disk, a hard disk, an optical disk, an optomagnetic disk, a CD-ROM, a magnetic tape, a non-volatile memory card, an ROM, or the like can be used.

It will be obviously understood that the program codes are included in the embodiments of the present invention even in not only a case where the functions of the foregoing embodiments are realized by executing the supplied program codes by the computer but also a case where the functions of the foregoing embodiments are realized in cooperation with the OS (operating system) by which the program codes operate in the computer or another application software or the like.

Further, it will be also obviously understood that the present invention also incorporates a case where the supplied program codes are stored into a memory provided for a function expansion board of a computer or a function expansion unit connected to a computer and, after that, a CPU or the like provided for the function expansion board or function expansion unit executes a part or all of the actual processes on the basis of instructions of the program codes, and the functions of the foregoing embodiments are realized by the processes.

Although the present invention has been described above with respect to the preferred embodiments, the present invention is not limited to the foregoing embodiments but many modifications and variations are possible within the spirit and scope of the appended claims of the present invention.

What is claimed is:

1. An image processing method for obtaining a conversion parameter to be used for a signal conversion process between body color image data and light source color image data, said method comprising the step of:

calculating a parameter to match color appearance between a body color and a light source color with each other, for each of a plurality of representative colors; and calculating the conversion parameter to be used for the signal conversion process, on the basis of the plurality of parameters for each of the plurality of representative colors, wherein an approximate average value of the plurality of conversion parameters for each of the plurality of representative colors is used as the conversion parameter to be used for the signal conversion process.

2. An image processing method for obtaining a conversion parameter to be used for a signal conversion process between body color image data and light source color image data, said method comprising the steps of:

calculating a parameter to match color appearance between a body color and a light source color with each other, for each of a plurality of representative colors; and calculating the conversion parameter to be used for the signal conversion process, on the basis of the plurality of parameters for each of the plurality of representative colors, wherein the conversion parameter to be used for the signal conversion process is provided by performing weighting processes for the plurality of conversion parameters for each of the plurality of representative colors.

3. A method according to claim 2, wherein a stored color is considered in the weighting process.

4. An image processing method, wherein, in order to obtain a color signal which is sensed by performing a visual observation and a color matching of a light source color and a body color, a color matching experiment is performed for each of n colors to determine n correction coefficients $(k_r, k_g, k_b)$ for the respective n colors which are used for converting tristimulus values $(x_{1i}, Y_{1i}, Z_{1i})$ of the light source color and tristimulus values $(X_{2i}, Y_{2i}, Z_{2i})$ of the body color in a following equation 1-(2), and the tristimulus values of the light source color and the body color are converted by using an average value of the n correction coefficients $$\begin{pmatrix} X_{1i} \\ Y_{1i} \\ Z_{1i} \end{pmatrix} = \begin{pmatrix} X_r & X_g & X_b \\ Y_r & Y_g & Y_b \\ Z_r & Z_g & Z_b \end{pmatrix} \begin{pmatrix} f(R) \\ f(G) \\ f(B) \end{pmatrix} \quad \text{equation 1-(1)}$$

$$\begin{pmatrix} X_{2i} \\ Y_{2i} \\ Z_{2i} \end{pmatrix} = \begin{pmatrix} k_a & 0 & 0 \\ 0 & k_b & 0 \\ 0 & 0 & k_c \end{pmatrix} \begin{pmatrix} X_{1i} \\ Y_{1i} \\ Z_{1i} \end{pmatrix}. \quad \text{equation 1-(2)}$$

5. An image processing method for obtaining a conversion parameter to be used for a signal conversion process between body color image data and light source color image data, said method comprising the steps of:

calculating a parameter to match color appearance between a body color and a light source color with each other, for each of a plurality of representative colors;

calculating the conversion parameter to be used for the signal conversion process, on the basis of the plurality of parameters for each of the plurality of representative colors;

converting color image data dependent on an input device on the basis of a profile of the input device;

converting the converted color image data by using the conversion parameter; and converting the converted color image data by using a profile of an output device.

6. An image processing apparatus for executing a conversion condition to be used for a conversion corresponding to an observation illumination, said apparatus comprising:

input means for inputting a user instruction to select a sample corresponding to white in the observation illumination from outputted samples;

setting means for setting the conversion condition on a basis of the sample corresponding to the selected white;

means for converting color image data dependant on an input device on a basis of a profile of the input device;

means for converting the converted color image data by using the conversion condition; and means for converting the converted color image data by using a profile of an output device.

7. An image processing method of executing a conversion corresponding to an observation illumination, comprising the steps of:

inputting a user instruction to select a sample corresponding to white of body color under the observation illumination from display samples; and setting a conversion condition based on white information of the selected sample corresponding to white of body color and white information of a recording medium.

8. A recording medium which stores a program for realizing an image processing method of executing a conversion condition to be used for a conversion corresponding to an observation illumination, comprising the steps of:

inputting a user instruction to select a sample corresponding to white of body color under the observation illumination from display samples; and setting the conversion condition on1based on white information of the selected sample corresponding to white of body color and white information of a recording medium.

9. An image processing apparatus for executing a conversion corresponding to an observation illumination, said apparatus comprising:

input means for inputting a user instruction to select a sample corresponding to white of body color under the observation illumination from display samples; and setting means for setting a conversion condition based on white information of the selected sample corresponding to white of body color and white information of a recording medium.

10. An apparatus according to claim 9, wherein the conversion process corresponding to the observation illumination uses a color adaptation equation.

11. An apparatus according to claim 9, wherein the conversion process converts the body color image data indicating body color to the light source color image data indicating light source color.

12. An apparatus according to claim 9, wherein a conversion process means inputs light source color image data representing a desired light source color and outputs body color image data representing a body color corresponding to the desired light source color.

13. An apparatus according to claim 9, wherein the sample corresponding to white is a sample whose color appearance matches white of a recording medium in said observation illumination.

14. An apparatus according to claim 9, wherein the conversion process corresponding to the desired observation light source is executed in a color space not dependent on a device.

15. An apparatus according to claim 9, further comprising:

means for maintaining the conversion condition by corresponding to the observation source light.

* * * * *

UNITED STATES PATENT AND TRADEMARK OFFICE
CERTIFICATE OF CORRECTION

PATENT NO. : 6,320,980 B1
DATED : November 20, 2001
INVENTOR(S) : Yumiko Hidaka

It is certified that error appears in the above-identified patent and that said Letters Patent is hereby corrected as shown below:

Column 1,
Line 8, "the" should read -- a --;
Line 9, "perform" should read -- performs --;
Line 21, "the" should read -- a --;
Line 27, "there" should read -- these --;
Line 62, "a" should read -- as a --; and
Line 64, "the" (first occurrence) should read -- a --.

Column 2,
Line 2, "the" should read -- a --; and
Line 7, "a" should read -- as a --.

Column 3,
Line 15, "mean" should read -- means --; and
Line 24, "apparatus" should read -- apparent --.

Column 4,
Line 13, "a" should read -- in a --; and
Line 34, "more" should read -- further --.

Column 5,
Line 59, "coefficient" should read -- coefficient of --; and
Line 60, "such the" should read -- so that the --.

Column 6,
Line 6, "such that" should read -- so that --;
Line 40, "it" should be deleted; and
Line 59, "After then," should read -- Thereafter, --; and "the" (second occurrence) should be deleted.

Column 7,
Line 3, "it" should be deleted;
Line 64, "which" should be deleted; and
Line 67, "a" should be deleted.

Column 8,
Line 15, "it" should be deleted;
Line 16, "Human's" should read -- Human --;
Lines 18 and 19, "human's" should read -- human --;
Line 32, "such the" should read -- such a --;
Line 33, "the" should read -- a --;

UNITED STATES PATENT AND TRADEMARK OFFICE
CERTIFICATE OF CORRECTION

PATENT NO.    : 6,320,980 B1
DATED         : November 20, 2001
INVENTOR(S)   : Yumiko Hidaka It is certified that error appears in the above-identified patent and that said Letters Patent is hereby corrected as shown below:

Column 8 (cont'd),
Line 52, "the" (first occurrence) should read -- a --; and
Line 62, "the" should be deleted.

Column 9,
Line 28, "the" should read -- an --; and
Line 52, "any" should read -- in any --.

Column 11,
Line 19, "such the" should read -- such a --;
Line 35, "such the" should read -- such an --; and
Line 63, "the" should read -- a --.

Column 12,
Line 22, "the" should read -- a --.

Column 13,
Line 16, "an" should read -- a --; and
Line 46, "step" should read -- steps --.

Column 14,
Line 17, "($x_{li}$, $Y_{li}$, $Z_{li}$)" should read -- ($X_{li}$, $Y_{li}$, $Z_{li}$) --.

Column 15,
Line 14, "onlbased" should read -- based --.

Column 16,
Lines 4 and 8, "claim 9," should read -- claim 10, --.

Signed and Sealed this

Twelfth Day of August, 2003

JAMES E. ROGAN
*Director of the United States Patent and Trademark Office*